(12) United States Patent
Sugiyama et al.

(10) Patent No.: US 10,081,908 B2
(45) Date of Patent: Sep. 25, 2018

(54) WATER/OIL REPELLENT COMPOSITION, METHOD FOR PRODUCING WATER/OIL REPELLENT COMPOSITION AND ARTICLE

(71) Applicant: Asahi Glass Company, Limited, Chiyoda-ku (JP)

(72) Inventors: Kazunori Sugiyama, Chiyoda-ku (JP); Kyouichi Kaneko, Chiyoda-ku (JP); Sho Masuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 14/965,042

(22) Filed: Dec. 10, 2015

(65) Prior Publication Data

US 2016/0097153 A1   Apr. 7, 2016

Related U.S. Application Data

(63) Continuation of application No. PCT/JP2014/065496, filed on Jun. 11, 2014.

(30) Foreign Application Priority Data

Jun. 14, 2013   (JP) ................................ 2013-125507

(51) Int. Cl.
| | |
|---|---|
| *D06M 15/277* | (2006.01) |
| *D06M 15/53* | (2006.01) |
| *C08F 214/18* | (2006.01) |
| *C09D 133/16* | (2006.01) |
| *C08F 220/22* | (2006.01) |

(52) U.S. Cl.
CPC .......... *D06M 15/277* (2013.01); *C08F 214/18* (2013.01); *C08F 220/22* (2013.01); *C09D 133/16* (2013.01); *D06M 15/53* (2013.01); *D06M 2200/11* (2013.01); *D06M 2200/12* (2013.01)

(58) Field of Classification Search
CPC .................. C08F 220/22; C08F 220/56; C08F 2220/1891; C08F 214/18; C09D 133/16; C09D 171/02; C08L 71/02; D06M 15/277; D06M 15/53; D06M 2200/11; D06M 2200/12
See application file for complete search history.

(56) References Cited

U.S. PATENT DOCUMENTS

| | | | | |
|---|---|---|---|---|
| 2012/0037835 | A1* | 2/2012 | Otozawa | C08F 220/24 252/8.57 |
| 2014/0045992 | A1 | 2/2014 | Hirono et al. | |
| 2014/0051797 | A1 | 2/2014 | Kaneko et al. | |

FOREIGN PATENT DOCUMENTS

| | | | |
|---|---|---|---|
| EP | 2 439 249 A1 | | 4/2012 |
| JP | 9-118877 | | 5/1997 |
| JP | 3744034 | | 2/2006 |
| JP | 2009-215370 | | 9/2009 |
| JP | 2009-242679 A | | 10/2009 |
| JP | 2010-501656 | | 1/2010 |
| JP | 2011-201981 A | | 10/2011 |
| JP | 5351023 | | 11/2013 |
| WO | WO 2009/154126 A1 | | 12/2009 |
| WO | WO2010123042 | * | 10/2010 |
| WO | WO 2012/147625 A1 | | 11/2012 |

OTHER PUBLICATIONS

English Translation of International Search Report dated Sep. 16, 2014 in PCT/JP2014/065496, filed Jun. 11, 2014.

* cited by examiner

*Primary Examiner* — Shuangyi Abu Ali
(74) *Attorney, Agent, or Firm* — Oblon, McClelland, Maier & Neustadt, L.L.P.

(57) ABSTRACT

To provide a water/oil repellent composition which is excellent in the stability as a working liquid and the water repellency whereby the occurrence of scum having a high adhesion is low, to provide its production process and to provide an article of which the surface is treated with the water/oil repellent composition whereby the occurrence of dirt is suppressed.

A water/oil repellent composition which comprises a nonionic surfactant having a melting point of from 50° C. to 70° C., a fluorinated copolymer (for example, a copolymer of a (meth)acrylate having a $C_6$ perfluoroalkyl group) and a medium containing water.

8 Claims, No Drawings

WATER/OIL REPELLENT COMPOSITION, METHOD FOR PRODUCING WATER/OIL REPELLENT COMPOSITION AND ARTICLE

TECHNICAL FIELD

The present invention relates to a water/oil repellent composition, a method for its production and an article treated with the water/oil repellent composition.

BACKGROUND ART

As a method for imparting water/oil repellency and stain proofing property to the surface of a fiber product, etc., a method of treating an article with a water/oil repellent composition composed of an emulsion having a fluorinated copolymer having a polyfluoroalkyl group (hereinafter referred to as a $R^f$ group) dispersed in an aqueous medium has been known.

As a method for treating a fiber with a water/oil repellent composition, the Dip-Nip method is generally employed. That is, it is a method such that an open-shape fabric (raw fabric) is dipped in a treating bath and then squeezed by a roller, followed by carrying out a drying step at an ambient temperature or by heating and an adhering step to prepare a treated fabric.

As a phenomenon which impairs the productivity of a water/oil repellent treatment on a fabric, it sometimes occurs that emulsion particles in a water/oil repellent agent are broken by mechanical impact in a treating bath or by anionic impurities derived from a fabric, and they aggregate to be coarse particles (hereinafter referred to as "scum"). Such coarse particles are brought to a squeezing roller by the fabric being treated and deposited on the squeezing roller (hereinafter referred to as "gum up"). If scum deposits on a squeezing roller, scum is transferred onto the treated fabric, which may sometimes result in stain on the fabric or irregular treatment on the treated fabric. Further, in order to clean scum deposited on the squeezing roller, the treatment step is interrupted, and thereby the productivity is lowered.

Further, in recent years, biological accumulation of $R^f$ groups having at least 8 carbon atoms, for example pentafluorooctanesulfonic acid, is problematic, and a water/oil repellent composition having an $R^f$ group having at most 6 carbon atoms has been proposed (Patent Document 1). However, in the case of a water/oil repellent composition comprising a copolymer having an $R^f$ group having at most 6 carbon atoms, the frequency that scum is formed is high, since the crystallinity of the $R^f$ group in a side chain is low. As a result, gum up may result. Further, scum having a strong adhesion is formed, since the crystallinity is low. As a result, a squeezing roller becomes very sticky, and thereby it is necessary to spent labor for cleaning.

In order to overcome the above problem, a water/oil repellent agent having excellent stability against impurities has been proposed (Patent Document 2). However, practically, surplus treating bath after squeezing by a squeezing roller is reused, and it is thereby difficult to completely suppress the occurrence of scum. Thus, scum gradually increases, and finally gum up results.

PRIOR ART DOCUMENTS

Patent Documents

Patent Document 1: JP-A-2010-501656
Patent Document 2: JP-A-9-118877

DISCLOSURE OF INVENTION

Technical Problem

It is an object of the present invention to provide a water/oil repellent composition which is excellent in the stability as a treating bath and the water repellency, whereby scum having a high adhesion is seldom formed, and the removability of gum up is excellent, to provide its production process and to provide an article of which the surface is treated with the water/oil repellent composition whereby stain is suppressed.

Solution to Problem

As a result of an extensive study, the present inventors have found that the above object can be accomplished by a water/oil repellent composition containing a specific nonionic surfactant.

The present invention provides a water/oil repellent composition, its production method and an article of which the surface is treated with the water/oil repellent composition, which have the constructions [1] to [14].

[1] A water/oil repellent composition which comprises a nonionic surfactant having a melting point of from 50° C. to 70° C., a fluorinated copolymer and a medium containing water.

[2] The water/oil repellent composition according to the above [1], wherein the content of the nonionic surfactant is from 0.1 to 10 mass %, per 100 mass % of the fluorinated copolymer.

[3] The water/oil repellent composition according to the above [1] or [2], wherein the nonionic surfactant is at least one member selected from the group consisting of 50 mol stearyl polyoxyethylene adduct, 40 mol stearyl polyoxyethylene adduct, 60 mol oleyl polyoxyethylene adduct, 50 mol oleyl polyexyethylene adduct, 40 mol oleyl polyoxyethylene adduct and 30 mol behenyl polyoxyethylene adduct.

[4] The water/oil repellent composition according to the above [1] or [2], wherein the nonionic surfactant is at least one selected from the group consisting of 50 mol stearyl polyoxyethylene adduct, 50 mol oleyl polyexyethylene adduct and 30 mol behenyl polyoxyethylene adduct.

[5] The water/oil repellent composition according to any one of the above [1] to [4], wherein the fluorinated copolymer has structural units based on the following monomer (a) and structural units based on the following monomer (b):

monomer (a): represented by $(Z—Y)_n X$, wherein
Z: a polyfluoroalkyl group having at most 6 carbon atoms or a group represented by $C_m F_{2m+1}O(CF_2CF(CF_3)O)_d CF(CF_3)$— (m is an integer of from 1 to 6, and d is an integer of from 1 to 4),
Y: a bivalent organic group or a single bond,
n: 1 or 2; and
X: a polymerizable unsaturated group, and when n is 1, X is —CR═CH$_2$, —COOCR═CH$_2$, —OCOCR═CH$_2$, —OCH$_2$-φ-CR═CH$_2$ or —OCH═CH$_2$, and when n is 2, X is ═CH(CH$_2$)$_q$ CR═CH$_2$, ═CH(CH$_2$)$_q$ COOCR═CH$_2$, ═CH(CH$_2$)$_q$ OCOCR═CH$_2$ or —OCOCH═CHCOO—
wherein R is a hydrogen atom, a methyl group or a halogen atom, p is a phenylene group, and q is an integer of from 0 to 4 monomer (b): an acrylate having a saturated hydrocarbon group having at least 12 carbon atoms or a methacrylate having a saturated hydrocarbon group having at least 12 carbon atoms.

[6] The water/oil repellent composition according to any one of the above [1] to [5], which further contains a nonionic surfactant having a melting point of lower than 50° C.
[7] The water/oil repellent composition according to any one of the above [1] to [6], wherein in the medium containing water, the fluorinated copolymer forms a fluorinated copolymer emulsion with at least a part of the nonionic surfactant having a melting point of from 50° C. to 70° C., and the fluorinated copolymer emulsion has an average particle size of from 5 nm to 300 nm.
[8] A method for producing a water/oil repellent composition, which comprises a step (1) of adding monomers containing a fluorinated monomer and a nonionic surfactant having a melting point of from 50° C. to 70° C. in a medium containing water, followed by emulsion polymerization to obtain a fluorinated copolymer emulsion and a step (2) of preparing a water/oil repellent composition by using the fluorinated copolymer emulsion obtained in step (1).
[9] The method for producing a water/oil repellent composition according to the above [8], wherein the amount of the nonionic surfactant to be added is from 0.1 to 10 mass % per 100 mass % of the monomers containing a fluorinated monomer.
[10] The method for producing a water/oil repellent composition according to the above [8] or [9], wherein the nonionic surfactant is at least one member selected from the group consisting of 50 mol stearyl polyoxyethylene adduct, 40 mol stearyl polyoxyethylene adduct, 60 mol oleyl polyoxyethylene adduct, 50 mol oleyl polyexyethylene adduct, 40 mol oleyl polyoxyethylene adduct and 30 mol behenyl polyoxyethylene adduct.
[11] The method for producing a water/oil repellent composition according to the above [8] or [9], wherein the nonionic surfactant is at least one member selected from the group consisting of 50 mol stearyl polyoxyethylene adduct, 50 mol oleyl polyexyethylene adduct and 30 mol behenyl polyoxyethylene adduct.
[12] The method for producing a water/oil repellent composition according to any one of the above [8] to [11], wherein the monomers containing the fluorinated monomer contains the following monomer (a) and the following monomer (b):
monomer (a): represented by $(Z-Y)_nX$, wherein
Z: a polyfluoroalkyl group having at most 6 carbon atoms or a group represented by $C_mF_{2m+1}O(CF_2CF(CF_3)O)_dCF(CF_3)$— (m is an integer of from 1 to 6, and d is an integer of from 1 to 4),
Y: a bivalent organic group or a single bond,
n: 1 or 2; and
X: a polymerizable unsaturated group, and when n is 1, —CR=CH$_2$, X is —COOCR=CH$_2$, —OCOCR=CH$_2$, —OCH$_2$-φ-CR=CH$_2$ or —OCH=CH$_2$, and when n is 2, X is =CH(CH$_2$)$_q$CR=CH$_2$, =CH(CH$_2$)$_q$COOCR=CH$_2$, =CH(CH$_2$)$_q$OCOCR=CH$_2$ or —OCOCH=CHCOO—
wherein R is a hydrogen atom, a methyl group or a halogen atom, and φ is a phenylene group, and q is an integer of from 0 to 4
monomer (b): an acrylate having a saturated hydrocarbon group having at least 12 carbon atoms or a methacrylate having a saturated hydrocarbon group having at least 12 carbon atoms.
[13] The method for producing a water/oil repellent composition according to any one of the above [8] to [12], wherein the step (1) further contains a nonionic surfactant having a melting point of less than 50° C.
[14] An article of which the lower surface is treated with the water/oil repellent composition as defined in any one of the above [1] to [7] and which has a coating film of the fluorinated copolymer on the surface.

Advantageous Effects of Invention

The water/oil repellent composition of the present invention is excellent in the stability as a treating bath and excellent in the water repellency, whereby scum having a high adhesion is seldom formed, and the removability of gum up is excellent.
According to the method for producing a water/oil repellent composition of the present invention, it is possible to produce a water/oil repellent composition which is excellent in the stability and the water repellency whereby the occurrence of scum having a high adhesion at the time of treating an article is low, and the removability of gum up is excellent.
Further, in the case of an article of which the surface is treated with the water/oil repellent composition of the present invention, stain at the time of treating the surface is suppressed.

DESCRIPTION OF EMBODIMENTS

Water/Oil Repellent Composition
The water/oil repellent composition of the present invention comprises a nonionic surfactant having a melting point of from 50° C. to 70° C., a fluorinated copolymer and a medium containing water.
In the present invention, the nonionic surfactant is a surfactant which is nonionic.
The melting point of the nonionic surfactant is a temperature measured as a dissolving peak temperature, when the nonionic surfactant is analyzed by using a differential scanning calorimetry by the method in accordance with JIS K7121-1987.
In the present invention, by using a nonionic surfactant having a melting point of at least 50° C., the adhesion of scum to be formed can be suppressed, scum can be suppressed from attaching on a roller, etc., and the releasability from a squeezing roller, etc. can be improved, whereby the removability of gum up is improved. Further, by using a nonionic surfactant having a melting point of at most 70° C., the recrystallization of the nonionic surfactant at the time of emulsion polymerization can be suppressed, and the deterioration of the polymerization stability can be suppressed. Further, by using the nonionic surfactant having a melting point of at most 70° C., a fluorinated copolymer is made to stably exist in a medium.
The melting point of the nonionic surfactant is preferably from 50 to 60° C., and from the viewpoint of handling efficiency, the melting point is more preferably from 50 to 55° C.
The content of the nonionic surfactant having a melting point of from 50 to 70° C. is from 0.1 mass % to 10 mass %, more preferably from 0.5 mass % to 7 mass %, particularly preferably from 1 mass % to 5 mass %, per 100 mass % of the fluorinated copolymer to be contained. When the content is at least 0.1 mass %, the formation of scum having a high adhesion can be further suppressed, and when the content is at most 10 mass %, an article to be treated with the water/oil repellent agent is excellent in the water repellency.
As the nonionic surfactant having a melting point of from 50 to 70° C., a conventional nonionic surfactant may be used, however, an alkyl polyalkyloxide type, an alkylene polyalkyloxide type or the like may suitably be used. Particularly, from the viewpoint of the relationship between the length of an alkyl chain and the crystallinity, etc., a nonionic surfactant having an alkyl group having at least 18 carbon atoms is preferred.

The nonionic surfactant having a melting point of from 50 to 70° C. may, for example, be EMALEX640 (tradename, manufactured by NIHON EMULSION Co., Ltd.) which is 40 mol stearyl polyoxyethylene adduct, EMULGEN 350 (tradename, manufactured by Kao Corporation) and BLAUNON SR-750 (tradename, manufactured by Aoki Oil Industrial Co., Ltd.) which are 50 mol stearyl polyoxyethylene adducts, BLAUNON EN-1540 (tradename, manufactured by Aoki Oil Industrial Co., Ltd.) which is 40 mol oleyl polyoxyethylene adduct, EMALEX550 (tradename, manufactured by NIHON EMULSION Co., Ltd.) and NIKKOL BO50V (tradename, manufactured by Nikko Chemicals Co., Ltd.) which are 50 mol oleyl polyoxyethylene adducts, BLAUNON EN-1560 (tradename, manufactured by Aoki Oil Industrial Co., Ltd.) which is 60 mol oleyl polyoxyethylene adduct or NIKKOL BB30 (tradename, manufactured by Nikko Chemicals Co., Ltd.) and EMALEX BHA-30 (tradename, manufactured by NIHON EMULSION Co., Ltd.) which are 30 mol behenyl polyoxyethylene adducts.

From the viewpoints of the handling efficiency at the time of polymerization and the stability of a dispersion after the polymerization, EMULGEN 350 (tradename, manufactured by Kao Corporation) which is 50 mol stearylpolyoxy ethylene adduct, EMALEX550 (tradename, manufactured by NIHON EMULSION Co., Ltd.) and NIKKOL BO50V (tradename, manufactured by Nikko Chemicals Co., Ltd.) which are 50 mol oleyl polyoxyethylene adducts and EMALEX BHA-30 (tradename, manufactured by NIHON EMULSION Co., Ltd.) and NIKKOL BB30 (tradename, manufactured by Nikko Chemicals Co., Ltd.) which are 30 mol behenyl polyoxyethylene adducts, are particularly preferred.

In the present invention, the fluorinated copolymer is a copolymer containing fluorine.

The fluorinated copolymer preferably has structural units based on the following monomer (a) and structural units based on the following monomer (b), whereby excellent water/oil repellency can be imparted to an article.

[Monomer (a)]

The monomer (a) is represented by $(Z-Y)_nX$, wherein Z: a perfluoroalkyl group having at most 6 carbon atoms or a group represented by $C_m F_{2m+1}O(CF_2CF(CF_3)O)_dCF(CF_3)$— (m is an integer of from 1 to 6, and d is an integer of from 1 to 4), preferably a perfluoroalkyl group having at most 6 carbon atoms, more preferably a $C_{4-6}$ perfluoroalkyl group, most preferably a $C_6$ perfluoroalkyl group, Y: a bivalent organic group or a single bond, preferably —$(CH_2)_r$— (r is an integer of from 1 to 4), more preferably —$CH_2CH_2$—, n: 1 or 2, preferably 1; and X: a polymerizable unsaturated group, and when n is 1, X is —CR=$CH_2$, —COOCR=$CH_2$, —OCOCR=$CH_2$, —$OCH_2$-φ-CR=$CH_2$ or —OCH=$CH_2$, and when n is 2, X is =CH$(CH_2)_q$CR=$CH_2$, =CH$(CH_2)_q$ COOCR=$CH_2$, =CH$(CH_2)_q$ OCOCR=$CH_2$ or —OCOCH=CHCOO— wherein R is a hydrogen atom, a methyl group or a halogen atom, preferably a hydrogen atom or a methyl group, φ is a phenylene group, and q is an integer of from 0 to 4.

X is preferably —OCOC$(CH_3)$=$CH_2$, —OCOCH=$CH_2$, particularly preferably —OCOC$(CH_3)$=$CH_2$.

From the viewpoints of the polymerizability with another monomer, the flexibility of a coating film containing a copolymer, the adhesion of a copolymer to an article, the solubility in a medium and the easiness of emulsion polymerization, the monomer (a) is preferably a (meth)acrylate having a perfluoroalkyl group having at most 6 carbon atoms, more preferably a (meth)acrylate having a $C_{4-6}$ perfluoroalkyl group, further preferably a methacrylate having a $C_{4-6}$ perfluoroalkyl group.

Here, the (meth)acrylate includes a methacrylate and an acrylate.

As specific examples, $CF_3$ $(CF_2)_5CH_2CH_2OCOC(CH_3)$=$CH_2$, $CF_3$ $(CF_2)_5CH_2CH_2OCOCH$=$CH_2$, $CF_3$ $(CF_2)_5CH_2CH_2OCOC(Cl)$=$CH_2$, $CF_3$ $(CF_2)_3CH_2CH_2OCOC(CH_3)$=$CH_2$, $CF_3$ $(CF_2)_3CH_2CH_2OCOCH$=$CH_2$, $CF_3$ $(CF_2)_3CH_2CH_2OCOC(Cl)$=$CH_2$, $CF_3$ $(CF_2)_5CH_2OCOC(CH_3)$=$CH_2$, $CF_3$ $(CF_2)_5CH_2OCOCH$=$CH_2$ or $CF_3$ $(CF_2)_5CH_2OCOC(Cl)$=$CH_2$, may be mentioned.

[Monomer (b)]

The monomer (b) is an acrylate having an alkyl group having at least 12 carbon atoms or a methacrylate having an alkyl group having at least 12 carbon atoms. The number of carbon atoms of the alkyl group is preferably from 16 to 30, more preferably from 18 to 30, from the viewpoint of the water repellency.

The monomer (b) may, for example, be a cetyl(meth)acrylate, a stearyl(meth)acrylate or a behenyl(meth)acrylate.

The monomer (b) is preferably a stearyl(meth)acrylate, a behenyl(meth)acrylate or the like, from the viewpoints of the water/oil repellency and texture of an article of which the surface is treated with a water/oil repellent composition to be obtained.

The fluorinated copolymer of the present invention may have structural units based on another monomer in addition to the structural units based on the monomer (a) and the structural units based on the monomer (b), so long as the effects of the present invention are not impaired.

Such another monomer may, for example, be a vinyl halide or a vinylidene halide. The vinyl halide is preferably a vinyl chloride, and the vinylidene halide is preferably a vinylidene chloride. By using them, the adhesion of a water/oil repellent composition to be obtained to an article can be further improved, and the water/oil repellency can be further improved.

Further, as such another monomer, a monomer having a functional group to be crosslinked may be mentioned. The functional group may, for example, be an isocyanate group, a blocked isocyanate group, a hydroxy group, a carboxy group or a methylol group.

The above-mentioned monomer is preferably a monomer having a blocked isocyanate group, a methylol group or a hydroxy group, particularly preferably 3,5-dimethylpyrazole adduct of 2-isocyanatoethyl (meth)acrylate, N-methylol (meth)acrylamide, a hydroxyethyl (meth)acrylate or the like.

In the fluorinated copolymer of the present invention, the content of structural units based on the monomer (a) is from 8 to 90 mass %, preferably from 20 to 85 mass %, more preferably from 40 to 80 mass % based on the total monomer units (100 mass %) in the fluorinated copolymer.

The content of structural units based on the monomer (b) is from 0 to 80 mass %, preferably from 1 to 65 mass %, more preferably from 5 to 50 mass %, based on the total monomer units (100 mass %) in the fluorinated copolymer.

The content of structural units based on another monomer is from 0 to 80 mass %, preferably from 0.1 to 50 mass %, more preferably from 0.5 to 30 mass %, based on the total monomer units (100 mass %) in the fluorinated copolymer.

The water/oil repellent composition of the present invention contains a medium containing water. The medium containing water may, for example, be water, an alcohol, a glycol, a glycol ether, a halogenated compound, a hydrocarbon, a ketone, an ester, an ether, a nitrogen compound, a sulfur compound, an inorganic solvent or an organic acid. Among them, at least one medium selected from the group consisting of water, an alcohol, a glycol, a glycol ether and a glycol ester is preferred from the viewpoints of the solubility and the easiness of handling.

In a case where a medium other than water is contained, the content of the medium other than water is preferably from 0 to 60 parts by mass, more preferably from 5 to 50 parts by mass, per 100 parts by mass of water.

It is preferred that the fluorinated copolymer is dispersed in a medium containing water so as to form a fluorinated copolymer emulsion with at least a part of a nonionic surfactant having a melting point of from 50° C. to 70° C.

The average particle size of the fluorinated copolymer emulsion is preferably from 5 to 300 nm, more preferably from 50 to 200 nm. When the average particle size is at least 5 nm, good treating bath stability can be maintained. When the average particle size is at most 300 nm, fluorinated copolymer particles can be uniformly attached on a surface of a fiber product. The average particle size of the fluorinated copolymer emulsion can be obtained by a dynamic light scattering method (measuring device) or a laser diffraction method.

The water/oil repellent composition of the present invention preferably further contains a nonionic surfactant having a melting point of lower than 50° C., in addition to the nonionic surfactant having a melting point of from 50 to 70° C. When the water/oil repellent composition contains a nonionic surfactant having a melting point of lower than 50° C., the stability against impurities is improved, and when a water/oil repellent composition to be obtained is applied to an article, the formation of scum itself can be suppressed.

As the nonionic surfactant having a melting point of lower than 50° C., a known one may be used, however, an ethyleneoxide propylene oxide polymer (PRONON series, manufactures of NOF Corporation) is preferred.

Further, 2,4,7,9-tetramethyl-5-decyn-4,7-diol ethyleneoxide adduct (Surfynol series, manufactures of Nissin Chemical Industry Co., Ltd.) is preferred. They may be used alone or in combination. When the Surfynol series is used, an effect to improve the permeability of water/oil repellent composition to an article is obtained.

Further, the nonionic surfactant having a melting point of lower than 50° C. preferably has HLB (hydrophile-lipophile balance) of less than 17 from the viewpoints of the dispersibility of a fluorinated copolymer and an effect to prevent gum up.

The water/oil repellent composition of the present invention may contain a surfactant other than the above, so long as the effect of the present invention are not impaired. The surfactant may, for example, be a cationic surfactant, an anionic surfactant or an amphoteric surfactant. When the surfactant is contained, the stability of the water/oil repellent composition against impurities can be further improved.

The cationic surfactant is preferably an ammonium salt-substituted type cationic surfactant. Specifically, a cationic surfactant having a structure of $(R)_4N^+ \cdot X^-$ is preferred. Here, R is preferably a hydrogen atom, a $C_{1-22}$ alkyl group or a $C_{2-22}$ alkenyl group, and four R may be the same or different. Among four R, one R is preferably a $C_{6-22}$ alkyl group, particularly preferably a $C_{12-18}$ alkyl group, and the other three R are preferably methyl groups. $X^-$ is a counter ion, and a chlorine ion, an ethyl sulfate ion or an acetate ion may be exemplified. $X^-$ is particularly preferably a chlorine ion. As a preferred cationic surfactant, a $C_{12}$ (or a linear chain having a $C_{12}$ as the main component)alkyltrimethylammonium chloride or a stearyl (or a linear chain having a $C_{18}$ component as the main component)trimethylammonium chloride may be mentioned.

In the water/oil repellent composition of the present invention, as another additive, a penetrant, a defoaming agent, a water-absorbing agent, an antistatic agent, an anti-crease agent, a texture-adjusting agent, a film-forming assistant, a water-soluble polymer, a thermosetting agent (a melamine resin, a urethane resin, a triazine ring-containing compound, an isocyanate type compound, etc.), etc. may be used.

The specific gravity of the fluorinated copolymer in the present invention is preferably from at least 1.10 g/ml and less than 1.75 g/ml, more preferably from 1.10 g/ml to 1.50 g/ml. Within this range, even though scum is formed, such scum accumulate at the bottom of a treating bath soon, whereby the scum is not likely to be brought on a squeezing roller, and gum up can be prevented.

Specifically, by controlling the mol % of the monomer (a) in the fluorinated copolymer to at least 8% and less than 85%, the specific gravity of the fluorinated copolymer can be controlled.

<Method for Producing Water/Oil Repellent Composition>

The method for producing a fluorinated water/oil repellent composition of the present invention has the following steps (1) and (2).

Step (1): Monomers containing a fluorinated monomer and a nonionic surfactant having a melting point of from 50 to 70° C. are added to a medium containing water, followed by emulsion polymerization to obtain a fluorinated copolymer emulsion.

Step (2): A water/oil repellent composition is prepared by using the fluorinated copolymer emulsion obtained in step (1).

(Step (1))

In the step (1), monomers containing a fluorinated monomer and a nonionic surfactant having a melting point of from 50 to 70° C. are added in a medium containing water, followed by emulsion polymerization to obtain a fluorinated copolymer emulsion. As the medium containing water and the nonionic surfactant having a melting point of from 50 to 70° C., the above-mentioned medium and nonionic surfactant may be used.

The monomers containing a fluorinated monomer may contain another monomer in addition to the fluorinated monomer.

The monomers containing a fluorinated monomer are preferably monomers containing the monomer (a), more preferably monomers containing the monomer (a) and the monomer (b). By using the monomers containing the monomer (a) and the monomer (b), the texture of an article treated with a water/oil repellent composition to be obtained is made to be soft.

In the step (1), in addition to the nonionic surfactant having a melting point of from 50 to 70° C., a nonionic surfactant having a melting point of lower than 50° C. is further preferably added. By further adding the nonionic surfactant having a melting point of lower than 50° C., the stability against anionic impurities is improved, and when an article is treated with a water/oil repellent composition to be obtained, the formation of scum itself can be suppressed.

The fluorinated copolymer emulsion to be obtained after the emulsion polymerization is a dispersion having a fluorinated polymer formed by polymerizing the monomers containing a fluorinated monomer, dispersed with a surfactant containing a nonionic surfactant used in the emulsion polymerization, in a medium containing water.

The amount of the nonionic surfactant having a melting point of from 50 to 70° C. used in the step (1) is from 0.1 mass % to 10 mass %, preferably from 0.5 mass % to 7 mass %, more preferably from 1 mass % to 5 mass %, per the total mass (100 mass %) of the monomers containing a fluorinated monomer, from the viewpoint of the polymerization stability. Further, when the amount of the nonionic surfactant is at least 0.1 mass %, at a time of treating an article with a water/oil repellent agent, the formation of scum having a high adhesion can be further suppressed. When the amount of the nonionic surfactant is less than 10 mass %, an article treated with a water/oil repellent agent is excellent in the water repellency.

(Step (2))

In the step (2), a water/oil repellent composition is prepared by using the fluorinated copolymer emulsion obtained in the step (1). Here, the preparation may be carried out by any way of preparation, so long as the obtained fluorinated emulsion is a state to be used as a starting material of the water/oil repellent composition. The obtained fluorinated emulsion may be used as a water/oil repellent composition as it is. Further, the preparation may contain a step of removing a part of the medium or a part of the surfactant from the fluorinated emulsion.

As a preferred preparation, it may be exemplified to dilute the fluorinated emulsion with a medium to the predetermined concentration. By this preparation, a water/oil repellent composition can be easily produced.

The fluorinated water/oil repellent composition of the present invention may also be produced by the following steps (3) and (4).

Step (3): Monomers containing a fluorinated monomer and a surfactant other than a nonionic surfactant having a melting point of from 50 to 70° C. are added in a medium containing water, followed by emulsion polymerization to obtain a fluorinated copolymer emulsion.

Step (4): A nonionic surfactant having a melting point of from 50 to 70° C. is added to the fluorinated copolymer emulsion obtained in the step (3) to prepare a water/oil repellent composition.

The added amount of the nonionic surfactant having a melting point of from 50 to 70° C. used in the step (4) is preferably from 0.1 mass % to 10 mass %, per the mass of the fluorinated copolymer.

The polymerization initiator for the emulsion polymerization may, for example, be a thermal polymerization initiator, a photopolymerization initiator, a radiation polymerization initiator, a radical polymerization initiator, or an ionic polymerization initiator, and a water-soluble or oil-soluble radical polymerization initiator is preferred.

As the radical polymerization initiator, a conventional initiator such as an azo type polymerization initiator, a peroxide type polymerization initiator or a redox type initiator is employed depending upon the polymerization temperature. As the radical polymerization initiator, an azo type polymerization initiator is preferred, from the viewpoint of the handling efficiency at the time of the polymerization.

The amount of the polymerization initiator to be added is preferably from 0.1 to 5 parts by mass, more preferably from 0.2 to 3 parts by mass, per 100 parts by mass of the monomers containing a fluorinated monomer.

The polymerization temperature is preferably from 20 to 80° C., more preferably from 30 to 70° C.

At the time of polymerization, a molecular weight-controlling agent may be used. The molecular weight-controlling agent is preferably an aromatic compound, a mercapto alcohol or a mercaptan, particularly preferably an alkyl mercaptan. The amount of the molecular weight-controlling agent to be added is preferably from 0 to 5 parts by mass, more preferably from 0 to 3 parts by mass, per 100 parts by mass of the monomer mixture.

<Article>

The article of the present invention is an article of which the surface is treated with the water/oil repellent composition of the present invention.

The article of the present invention has a surface treated with the water/oil repellent composition of the present invention, whereby the surface of the article can be prevented from being stained due to scum formed at the time of treating the surface, or the irregular treatment can be suppressed.

Articles to be treated include, for example, fibers (natural fibers, synthetic fibers, mixed fibers, etc.), various fiber products, non-woven fabrics, resins, paper, leather, metals, stone, concrete, gypsum and glass.

The treating method may, for example, be a method of coating an article with a coating liquid containing the water/oil repellent composition by a known coating method, followed by drying, or a method of dipping an article in a coating liquid containing the water/oil repellent composition, followed by drying.

As the method for treating a surface of an article with the water/oil repellent composition of the present invention, any known methods may be employed, however, a conventional dip-nip method is particularly preferred.

The treatment with the water/oil repellent composition of the present invention may be carried out in combination with various functional finish such as antistatic finish, softening finish, antibacterial finish, deodorant finish, water proofing finish or anti-crease finish. The combination method may be any method of before the treatment with the water/oil repellent composition of the present invention, at the same time of the treatment and after the treatment.

The water proofing finish may be processing to provide a water proofing film. The water proofing film may, for example, be a porous film made of a urethane resin or an acrylic resin, a non-porous film made of a urethane resin or an acrylic resin, a polytetrafluoroethylene film or a moisture-permeable water proofing film made of a combination thereof.

EXAMPLES

Now, the present invention will be described in detail with reference to Examples, but it should be understood that the present invention is by no means thereby restricted.

[Method for Measuring Specific Gravity of Fluorinated Copolymer]

2-butanol/hexane (50/50 parts by mass) was added to a water/oil repellent composition, and an agglomerated fluorinated polymer was dried in vacuum, followed by pulverization to prepare a sample to be measured.

An empty specific gravity cup was preliminarily weighed, and under conditions of 23° C. and RH50%, the specific gravity cup was filled with a mixed solvent of isopropyl alcohol/HCFC225 (45/55 mixed solvent of HCFC225ca (3,3-dichloro-1,1,1,2,2-pentafluoropropane) and HCFC225cb (1,3-dichloro-1,1,2,2,3-pentafluoropropane))=80/20 (mass ratio), the total weight was measured, and the specific gravity of the mixed solvent was calculated in accordance with the following formula (1). As a result, $L\rho$ was 0.87 g/ml.

$$L\rho = (C-B)/A \qquad \text{Formula (1)}$$

(A: volume of specific gravity cup (ml), B: weight of specific gravity cup (g), C: weight (g) of specific gravity cup filled with mixed medium, Lρ: specific gravity of mixed medium)

Next, about 2 g of the sample to be measured was added in the specific gravity cup, and its weight was precisely weighed. Then, the specific gravity cup was filled with a mixed medium, and its weight was precisely weighed. The specific gravity (Pρ) of the sample to be measured was calculated in accordance with the following formula (2).

$$P\rho=(D-B)/(A-((E-D)/L\rho)) \quad \text{Formula (2)}$$

(D: weight (g) of the specific gravity cup in which the sample to be measured was added, E: weight (g) of the specific gravity cup in which the sample to be measured was added and which was filled with the mixed medium, Pρ: the specific gravity of the sample to be measured)

[Method for Measuring Melting Point of Nonionic Surfactant]

By using a differential scanning calorimetry, the temperature measured as the melting peak temperature at the time of analyzing a nonionic surfactant by the method in accordance with JIS K7121-1987, was taken as a melting point of the nonionic surfactant.

[Evaluation of Water Repellency]

With respect to a test fabric, the water repellency was evaluated in accordance with the spray test in JIS L1092 (2009). As shown in Table 1, the water repellency is represented by five grades of from 1 to 5. The higher the grade number is, the better the water repellency is. When the grade is at least 3, the water repellency is obtained. Further, a grade having +(−) attached shows the property is slightly better (worse) than that grade.

TABLE 1

| Grade of water repellency, etc. | State |
|---|---|
| 5 | Moisture and water droplets were not attached on surface. |
| 4 | Moisture was not attached on surface, however small droplets were attached. |
| 3 | Moisture in the form of small individual water droplets was observed on surface. |
| 2 | Moisture was observed on a half of surface, and small individual moisture penetrated the fabric. |
| 1 | Moisture was observed on the entire surface. |

[Evaluation of Mechanical Stability]

3 g of a water/oil repellent composition having a solid content concentration of 20 mass % was added in a 300 ml glass beaker and diluted with artificial hard water having hardness of 200 ppm prepared by using calcium chloride to be the total of 200 ml. The diluent was kept under the constant temperature at 35° C. and stirred at a rate of 2,500 rpm for 5 minutes by using a homogenizer. After finishing stirring, the diluent was filtrated through a filter cloth made of black polyester dyed fabric. A filtration residue was visually observed to evaluate the mechanical stability based on the standard in Table 2.

TABLE 2

| Evaluation | Standard |
|---|---|
| 5 | There was no residue |
| 4 | There was residue slightly |
| 3 | Residue was scattered on a filter cloth |
| 2 | Residue was scattered on a filter cloth entirely |
| 1 | Thick residue was scattered on a filter cloth |

[Evaluation of Removal Property of Gum Up]

2.5 g of a water/oil repellent composition prepared to have a solid content concentration of 20 mass % and 0.025 g of Dimafix ES (dye fixing agent for polyamide fibers, manufactured by Meisei Chemical Works, Ltd.) as anionic impurity were diluted to be 100 ml, with artificial hard water having a hardness of 150 ppm which was prepared by using calcium carbonate. At this time, scum formed in the liquid was taken, and a surface of an NBR (nitrile-butadiene rubber) rubber sheet (hardness of 85, black color) decreased with ethanol was coated with the scum. The coated NBR rubber sheet was dried at 40° C. for 4 hours, a coating film of scum applied on the NBR rubber sheet was scraped by a dispersing spoon. Here, the easiness of removing a coating film was evaluated as follows.

○: A coating film was easily peeled from an NBR rubber sheet.

Δ: A film was sticky and was not easily peeled from an NBR rubber sheet.

×: A film was sticky and could not be peeled from an NBR rubber sheet

ABBREVIATIONS (Monomer (a))
C6FMA: $F(CF_2)_6CH_2CH_2OC(O)C(CH_3)=CH_2$
(Monomer (b))
StA: stearyl acrylate
BeA: behenyl acrylate
(Monomer (c))
VdCl: vinylidene chloride
VCM: vinyl chloride
NMAM: N-methylol acrylamide
(Surfactant)
BB30: 30 mol behenyl polyoxyethylene adduct (BLAUNON BB30, manufactured by Aoki Oil Industrial Co., Ltd.)
BO50: 50 mol oleyl polyoxyethylene adduct (BLAUNON BO50, manufactured by Aoki Oil Industrial Co., Ltd.)
E350: 50 mol stearyl polyoxyethylene adduct (EMULGEN E350, manufactured by Kao Corporation)
E420: 20 mol oleyl polyoxyethylene adduct (EMULGEN E420, manufactured by Kao Corporation)
E147: 47 mol lauryl polyoxyethylene adduct (EMULGEN E147, manufactured by Kao Corporation)
E320: 20 mol stearyl polyoxyethylene adduct (EMULGEN E320, manufactured by Kao Corporation)
BB20: 20 mol oleyl polyoxyethylene adduct (BLAUNON BB20, manufactured by Aoki Oil Industrial Co., Ltd.)
E430: 30 mol oleyl polyoxyethylene adduct (EMULGEN E430, manufactured by Kao Corporation)
P204: ethylene oxide propylene oxide polymer (PRONON 204, manufactured by NOF Corporation)
SFN465: 2,4,7,9-tetramethyl-5-decyn-4,7-diolethyleneoxide adduct (Surfynol 465, manufactured by manufactured by Nissin Chemical Industry Co., Ltd.)
Aq18: stearyl trimethylammonium chloride (ARQUAD 18-63, manufactured by Lion Corporation)

(Molecular Weight-Controlling Agent)
  StSH: stearyl mercaptan
(Polymerization Initiator)
  VA-061A: acetate of 2,2'-azobis[2-(2-imidazolyn-2-yl)propane](VA-061, manufactured by Wako Pure Chemical Industries, Ltd.)
(Water)
  Water: deionized water
(Another Medium)
  DPG: dipropylene glycol

Example 1

Into a glass beaker, 194.7 g of C6FMA, 18.9 g of StA, 2.7 g of NMAM, 5.4 g of BB30, 2.7 g of SFN 465, 2.7 g of P204, 4.1 g of Aq 18, 1.4 g of StSH, 81.3 of DPG and 430.9 g of water were added, heated at 65° C. for 40 minutes and mixed by means of a mixer (HIGH-FLEX DISPERSER HG-92 manufactured by SMT Corporation) to obtain a preliminary emulsified liquid.

The obtained preliminarily emulsified liquid was treated under 40 MPa by means of a high pressure emulsifying machine (LAB60 manufactured by Gaulin) while maintaining the temperature at 60° C. to obtain an emulsified liquid. The obtained emulsified liquid was put into a stainless steel reactor and cooled to a temperature of at most 20° C., and 1.28 g of VA-061A was added. The vapor phase was substituted by nitrogen, and 13.5 g of VdCl and 40.6 g of VCM were introduced in turn. The reactor was put in a warm bath, and a polymerization reaction was carried out at 60° C. for 12 hours to obtain a fluorinated copolymer emulsion. The obtained fluorinated copolymer emulsion was diluted with deionized water so as to have the solid content concentration of 20 mass %, and thereby a water/oil repellent composition was obtained.

Examples 2 to 4 and Comparative Examples 1 to 5

An emulsion of a fluorinated copolymer was obtained in the same manner as in Example 1 except that the charged amounts of respective monomers were changed so as to agree with the proportions of the structure units based on the respective monomers and the surfactants as indicated in Table 3. The charged amounts of structural units based on the respective monomers and the proportions are shown in Table 3. The obtained fluorinated copolymer emulsion was diluted with the ionized water so as to have the solid content concentration of 20 mass %, and thereby a water/oil repellent composition was obtained.

Comparative Example 6

Into a glass beaker, 48.7 g of C6FMA, 135.3 g of StA, 27.0 g of BeA, 1.4 g of NMAM, 5.4 g of E430, 2.7 g of SFN 465, 2.7 g of P204, 2.7 g of Aq 18, 2.7 g of StSH, 81.3 of DPG and 419.2 g of water were added, heated at 65° C. for 40 minutes and mixed by means of a mixer (HIGH-FLEX DISPERSER HG-92 manufactured by SMT Corporation) to obtain a preliminarily emulsified liquid.

The obtained preliminary emulsified liquid was treated under 40 MPa by means of a high pressure emulsifying machine (LAB60 manufactured by Gaulin) while maintaining the temperature at 60° C. to obtain an emulsified liquid. The obtained emulsified liquid was put into a stainless steel reactor and cooled to a temperature of at most 20° C., and 1.35 g of VA-061A was added. The vapor phase was substituted by nitrogen, and 57.0 g of VCM was introduced. The reactor was put in a warm bath, and a polymerization reaction was carried out at 60° C. for 12 hours to obtain a fluorinated copolymer emulsion. The obtained fluorinated copolymer emulsion was diluted with deionized water so as to have the solid content concentration of 20 mass %, and thereby a water/oil repellent composition was obtained.

TABLE 3

| Obtained water/oil repellent agent | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Monomer [mass ratio] The value in ( ) represents charged amount. mass [g] | C6FMA | 72 (194.7) | 72 (194.7) | 72 (194.7) | 72 (194.7) | 72 (194.7) | 72 (194.7) | 72 (194.7) | 72 (194.7) | 72 (194.7) | 18 (48.7) |
| | VCM | 15 (40.6) | 15 (40.6) | 15 (40.6) | 15 (40.6) | 15 (40.6) | 15 (40.6) | 15 (40.6) | 15 (40.6) | 15 (40.6) | 21 (57.0) |
| | VdCl | 5 (13.5) | 5 (13.5) | 5 (13.5) | 5 (13.5) | 5 (13.5) | 5 (13.5) | 5 (13.5) | 5 (13.5) | 5 (13.5) | |
| | StA | 7 (18.9) | 7 (18.9) | 7 (18.9) | 7 (18.9) | 7 (18.9) | 7 (18.9) | 7 (18.9) | 7 (18.9) | 7 (18.9) | 50 (135.3) |
| | BeA | | | | | | | | | | 10 (27.0) |
| | NMAM | 1 (2.7) | 1 (2.7) | 1 (2.7) | 1 (2.7) | 1 (2.7) | 1 (2.7) | 1 (2.7) | 1 (2.7) | 1 (2.7) | 1 (1.4) |
| Surfactant [mass ratio] The value in ( ) represents charged amount. mass [g] | BB30 | 3 (8.1) | | | | | | | | | |
| | B050 | | 3 (8.1) | | | | | | | | |
| | E350 | | | 3 (8.1) | 2 (5.4) | | | | | | |
| | E420 | | | | | 3 (8.1) | | | | | |
| | E147 | | | | | | 3 (8.1) | | | | |
| | E320 | | | | | | | 3 (8.1) | | | |
| | BB20 | | | | | | | | 3 (8.1) | | |
| | E430 | | | | | | | | | 3 (8.1) | 2 (5.4) |
| | P204 | 1 (2.7) | 1 (2.7) | 1 (2.7) | 1 (2.7) | 1 (2.7) | 1 (2.7) | 1 (2.7) | 1 (2.7) | 1 (2.7) | 1 (2.7) |

TABLE 3-continued

| Obtained water/oil repellent agent | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| SFN465 | 1 (2.7) | 1 (2.7) | 1 (2.7) | 1 (2.7) | 1 (2.7) | 1 (2.7) | 1 (2.7) | 1 (2.7) | 1 (2.7) | 1 (2.7) |
| Aq18 | 1.5 (4.1) | 1.5 (4.1) | 1.5 (4.1) | 1.5 (4.1) | 1.5 (4.1) | 1.5 (4.1) | 1.5 (4.1) | 1.5 (4.1) | 1.5 (4.1) | 1.5 (4.1) |
| Mass [g] of fluorinated copolymer | 270.4 | 270.4 | 270.4 | 270.4 | 270.4 | 270.4 | 270.4 | 270.4 | 270.4 | 270.4 |
| Mass of nonionic surfactant having melting point of from 50-70° C./mass of fluorinated copolymer × 100 [mass %] | 3% | 3% | 3% | 2% | 0% | 0% | 0% | 0% | 0% | 0% |

[Measurement of Specific Gravity of Fluorinated Copolymer]

The specific gravity of the fluorinated copolymers obtained in Examples 1 to 4 and Comparative Examples 1 to 6 was measured. Measuring results are shown in Table 4.

TABLE 4

| | Specific gravity of fluorinated copolymer |
|---|---|
| Ex. 1 | 1.4 |
| Ex. 2 | 1.4 |
| Ex. 3 | 1.4 |
| Ex. 4 | 1.4 |
| Comp. Ex. 1 | 1.4 |
| Comp. Ex. 2 | 1.4 |
| Comp. Ex. 3 | 1.4 |
| Comp. Ex. 4 | 1.4 |
| Comp. Ex. 5 | 1.4 |
| Comp. Ex. 6 | 1.1 |

[Measurement of Melting Point of Nonionic Surfactant]

Results of measuring a melting point of the nonionic surfactant used in Examples 1 to 4 and Comparative Examples 1 to 6 are shown in Table 5.

TABLE 5

| | Type of used nonionic surfactant | Melting point of used nonionic surfactant |
|---|---|---|
| Ex. 1 | BB30 | 51.5° C. |
| Ex. 2 | BO50 | 53.3° C. |
| Ex. 3 | E350 | 54.1° C. |
| Ex. 4 | E350 | 54.1° C. |
| Comp. Ex. 1 | E420 | 29.3° C. |
| Comp. Ex. 2 | E147 | 36.5° C. |
| Comp. Ex. 3 | E320 | 43.7° C. |
| Comp. Ex. 4 | BB20 | 47.2° C. |
| Comp. Ex. 5 | E430 | 48.1° C. |
| Comp. Ex. 6 | E430 | 48.1° C. |

[Evaluation of Water Repellency]

The water repellency of fabrics treated with water/oil repellent compositions obtained in Examples 1 to 4 and Comparative Examples 1 to 6 by a continuous method so as to have a treating concentration of 2.0% were evaluated. Evaluation results are shown in Table 6.

TABLE 6

| | Water repellency |
|---|---|
| Treating concentration | 2.0% |
| Ex. 1 | 5 |
| Ex. 2 | 5 |

TABLE 6-continued

| | Water repellency |
|---|---|
| Ex. 3 | 5 |
| Ex. 4 | 5 |
| Comp. Ex. 1 | 5 |
| Comp. Ex. 2 | 5 |
| Comp. Ex. 3 | 5 |
| Comp. Ex. 4 | 5 |
| Comp. Ex. 5 | 5 |
| Comp. Ex. 6 | 5 |

[Evaluation of Mechanical Stability]

The mechanical stability of the water/oil repellent compositions obtained in Examples 1 to 4 and Comparative Examples 1 to 6 was evaluated. Evaluation results are shown in Table 7.

TABLE 7

| | Mechanical stability |
|---|---|
| Ex. 1 | 4 |
| Ex. 2 | 4 |
| Ex. 3 | 4 |
| Ex. 4 | 4 |
| Comp. Ex. 1 | 4 |
| Comp. Ex. 2 | 4 |
| Comp. Ex. 3 | 4 |
| Comp. Ex. 4 | 4 |
| Comp. Ex. 5 | 4 |
| Comp. Ex. 6 | 4 |

[Evaluation of Property to Remove Gum Up]

By using formed scum, the property to remove gum up was evaluated. Evaluation results are shown in Table 8.

TABLE 8

| | Property to remove gum up |
|---|---|
| Ex. 1 | ◯ |
| Ex. 2 | ◯ |
| Ex. 3 | ◯ |
| Ex. 4 | ◯ |
| Comp. Ex. 1 | x |
| Comp. Ex. 2 | x |
| Comp. Ex. 3 | Δ-x |
| Comp. Ex. 4 | Δ |
| Comp. Ex. 5 | Δ |
| Comp. Ex. 6 | Δ-x |

In Examples 1 to 4, scum on the NBR rubber sheet was easily removed. In Comparative Examples 1 to 6, it was difficult to remove scum on the NBR rubber sheet, since scum was very sticky.

It is evident from the above results that when an article is treated with the water/oil repellent composition of the present invention, good water repellency can be imparted. Further, it is evident that the water/oil repellent composition of the present invention is excellent in the mechanical stability and the property to remove gum up.

Further, anionic impurities were added in the water/oil repellent compositions obtained in Examples 1 to 4 and Comparative Examples 1 to 6, scum formed. In Comparative Example 6, formed scum was in a state of floating in the mixed liquid. If such a water/oil repellent composition is used to treat a fabric, scum is likely to be brought on a squeezing roller, and thereby gum up tends to form on the squeezing roller. On the other hand, in Examples 1 to 4 and Comparative Examples 1 to 5, formed scum was in a state of sedimentation in the mixed liquid. Thus, gum up tends not to form.

INDUSTRIAL APPLICABILITY

The water/oil repellent composition of the present invention is useful as a water/oil repellent composition for e.g. fiber products (clothing (sports wears, coats, jumpers, work clothes, uniforms, etc.), bags, carpets, curtains, wallpapers, interiors for vehicles, industrial materials, etc.), nonwoven fabrics, leather products, stone materials, concrete building materials, etc. Further, it is useful as a coating agent for filtration material or as a surface protective agent. Further, by mixing with e.g. polypropylene or nylon, followed by molding or forming into fibers, it is possible to impart water/oil repellency to such a molded product or a fiber product.

This application is a continuation of PCT Application No. PCT/JP2014/065496, filed on Jun. 11, 2014, which is based upon and claims the benefit of priority from Japanese Patent Application No. 2013-125507 filed on Jun. 14, 2013. The contents of those applications are incorporated herein by reference in their entireties.

What is claimed is:

1. A water/oil repellent composition, comprising:
   a nonionic surfactant having a melting point of from 50° C. to 55° C.,
   a fluorinated copolymer, and
   a medium containing water,
   wherein the nonionic surfactant is at least one member selected from the group consisting of 50 mol stearyl polyoxyethylene adduct, 40 mol stearyl polyoxyethylene adduct, 60 mol oleyl polyoxyethylene adduct, 50 mol oleyl polyexyethylene adduct, 40 mol oleyl polyoxyethylene adduct and 30 mol behenyl polyoxyethylene adduct, and
   wherein the fluorinated copolymer has structural units based on the following monomer (a) and structural units based on the following monomer (b):
   monomer (a): represented by $(Z-Y)_n X$, wherein
   Z is a perfluoroalkyl group having at most 6 carbon atoms or a group represented by $C_m F_{2m+1} O(CF_2 CF(CF_3)O)_d CF(CF_3)-$, wherein m is an integer of from 1 to 6, and d is an integer of from 1 to 4,
   Y is a bivalent organic group or a single bond,
   n is 1 or 2; and
   X is a polymerizable unsaturated group, and when n is 1, X is $-CR=CH_2$, $-COOCR=CH_2$, $-OCOCR=CH_2$, $-OCH_2-\varphi-CR=CH_2$ or $-OCH=CH_2$, and when n is 2, X is $=CH(CH_2)_q CR=CH_2$, $=CH(CH_2)_q COOCR=CH_2$, $=CH(CH_2)_q OCOCR=CH_2$ or $-OCOCH=CHCOO-$, wherein R is a hydrogen atom, a methyl group or a halogen atom, $\varphi$ is a phenylene group, and q is an integer of from 0 to 4,
   monomer (b): an acrylate having a saturated hydrocarbon group having at least 12 carbon atoms or a methacrylate having a saturated hydrocarbon group having at least 12 carbon atoms, and
   wherein the content of the nonionic surfactant is from 0.1 to 10 mass %, per 100 mass % of the fluorinated copolymer.

2. The water/oil repellent composition according to claim 1, wherein the nonionic surfactant is at least one selected from the group consisting of 50 mol stearyl polyoxyethylene adduct, 50 mol oleyl polyexyethylene adduct and 30 mol behenyl polyoxyethylene adduct.

3. The water/oil repellent composition according to claim 1, which further contains a nonionic surfactant having a melting point of lower than 50° C.

4. The water/oil repellent composition according to claim 1, wherein in the medium containing water, the fluorinated copolymer forms a fluorinated copolymer emulsion with at least a part of the nonionic surfactant having a melting point of from 50° C. to 55° C., and the fluorinated copolymer emulsion has an average particle size of from 5 nm to 300 nm.

5. A method for producing the water/oil repellent composition of claim 1, the method comprising:
   (1) adding monomers containing a fluorinated monomer and a nonionic surfactant having a melting point of from 50° C. to 55° C. in a medium containing water, followed by emulsion polymerization to obtain a fluorinated copolymer emulsion, and
   (2) preparing the water/oil repellent composition by using the fluorinated copolymer emulsion obtained in (1).

6. The method for producing a water/oil repellent composition according to claim 5, wherein the nonionic surfactant is at least one member selected from the group consisting of 50 mol stearyl polyoxyethylene adduct, 50 mol oleyl polyexyethylene adduct and 30 mol behenyl polyoxyethylene adduct.

7. The method for producing a water/oil repellent composition according to claim 5, wherein the (1) further contains a nonionic surfactant having a melting point of lower than 50° C.

8. An article of which the surface is treated with the water/oil repellent composition as defined in claim 1 and which has a coating film of the fluorinated copolymer on the surface.

* * * * *